United States Patent
Kraus et al.

(10) Patent No.: US 7,296,951 B2
(45) Date of Patent: *Nov. 20, 2007

(54) VIBRATORY SPIRAL CONVEYOR

(75) Inventors: Richard B. Kraus, Barrington, IL (US); Kurt Christopherson, South Elgin, IL (US); Robert Markowski, McHenry, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/153,677

(22) Filed: Jun. 15, 2005
(Under 37 CFR 1.47)

(65) Prior Publication Data

US 2006/0054465 A1   Mar. 16, 2006

Related U.S. Application Data

(60) Provisional application No. 60/604,227, filed on Aug. 25, 2004.

(51) Int. Cl.
*B65G 53/40* (2006.01)
(52) U.S. Cl. ........................... 406/75; 406/89; 198/778
(58) Field of Classification Search ............... 198/778; 406/52, 66, 73, 74, 75, 93, 89
See application file for complete search history.

(56) References Cited

U.S. PATENT DOCUMENTS

| | | | |
|---|---|---|---|
| 2,927,683 A | 3/1960 | Carrier, Jr. | |
| 3,664,487 A * | 5/1972 | Ballenger | 198/778 |
| 3,789,977 A | 2/1974 | Musschoot | |
| 3,848,343 A | 11/1974 | Musschoot | |
| 3,850,288 A | 11/1974 | Musschoot | |
| 4,140,215 A | 2/1979 | Musschoot | |
| 4,775,284 A | 10/1988 | Musschoot | |
| 4,875,343 A * | 10/1989 | Jeppsson | 62/381 |
| 4,953,365 A * | 9/1990 | Lang et al. | 62/381 |
| 5,024,320 A | 6/1991 | Musschoot | |
| 5,413,213 A * | 5/1995 | Golz et al. | 198/778 |
| 6,827,201 B1 * | 12/2004 | Markowski et al. | 198/753 |
| 7,037,048 B2 * | 5/2006 | Markowski et al. | 406/73 |
| 2004/0168889 A1 | 9/2004 | Markowski et al. | |

FOREIGN PATENT DOCUMENTS

| | | |
|---|---|---|
| DE | 4106712 | 6/1992 |
| DE | 4228543 | 11/1993 |
| GB | 2235756 | 3/1991 |
| JP | 10-339571 | 12/1998 |

OTHER PUBLICATIONS

Extended Search Report of the European Patent Office in regard to the counterpart EP application (8 pages).

* cited by examiner

*Primary Examiner*—Joe Dillon, Jr.
(74) *Attorney, Agent, or Firm*—Marshall, Gerstein & Borun LLP

(57) ABSTRACT

A vibratory conveyor for transporting an object includes a spiral deck enclosed in a housing having passageways for allowing air flow between adjacent deck tier segments. In addition, the conveyor may include two concentric spiral decks operably coupled to one another, wherein a vibratory force is capable of simultaneously advancing objects both up the first spiral deck and down the second spiral deck.

13 Claims, 13 Drawing Sheets

VIBRATORY SPIRAL CONVEYOR

CROSS-REFERENCE TO RELATED APPLICATION

This application claims priority to U.S. Provisional Ser. No. 60/604,227, filed on Aug. 25, 2004.

FIELD OF THE DISCLOSURE

The present disclosure generally relates to vibratory process equipment and, more particularly, to vibratory spiral conveyors for transporting work pieces.

BACKGROUND OF THE DISCLOSURE

Vibratory spiral conveyors are generally known in the art. Such apparatus typically includes a spiral deck, formed in the shape of a helix, and a source of vibration operatively coupled to the deck. The spiral conveyor may be a brute force system, such as that disclosed in U.S. Pat. No. 2,927,683 to Carrier, or a two-mass system, as disclosed in U.S. Pat. No. 5,024,320 to Musschoot.

Spiral conveyors are often used to heat or cool work pieces or granular material. With foundry castings, for example, red hot castings (which may have a temperature of approximately 1000 degrees F. or more) are fed into the spiral conveyor. Cool air is directed over the castings as the castings travel up the spiral, thereby to reduce the temperature of the castings. Conventional spiral conveyors direct air from a center axis of the conveyor outwardly, with or without nozzles for directing the air toward the castings. The air is exhausted out an exterior of the spiral conveyor.

In one conventional design, air is generally directed radially across the spiral conveyor from the center core inlets to the outer periphery outlets. As a result, the inner facing side of the castings (or the inner row, should more than one row of castings be fed into the conveyor) will receive a lower temperature air than the outer facing side (or outer row).

In another conventional design, both the air inlet and air outlet are positioned at the outer periphery of the spiral conveyor. As the air enters the spiral conveyor area, it passes about the center core in at least two separate sub-streams. The air then exhausts from the spiral conveyor through a common outlet.

In addition, the deck used in conventional spiral conveyors is typically constructed of plate steel. As a result, when viewed in cross-section, the conveying surface defined by the deck is typically "flat" across the width of the deck. Stated alternatively, the conveying surface is substantially linear across its width.

While a flat deck is satisfactory for many applications, it may cause unintended and undesirable results when used to convey certain objects. For example, when conveying generally cylindrical objects such as cam shafts along a flat deck, the objects may roll transversely across the width of the deck, and therefore are not located on the deck with any degree of certainty. In addition, the cylindrical objects may become oriented transversely across the deck, and therefore more easily roll into and possibly damage other objects on the deck.

Flat decks are also difficult to employ for certain path configurations. In a spiral conveyor, for example, it is preferable to form the deck in a helicoid shape. To approximate the helicoid shape with flat plate steel, several bends such as cross crimps are typically formed in the deck. Such cross crimps, however, create abrupt changes in the pitch of the deck and cause the conveying surface to be non-linear across its width. Consequently, the cross-crimps create localized high wear area and non-uniform stresses in the deck. These problems are exacerbated during thermal expansion and contraction, which can be significant when the spiral conveyor is used for heating or cooling of the objects being conveyed. In addition, the need for cross crimps or other bends in the deck increases manufacturing costs and makes assembly more difficult, especially for conveyors that are constructed as multiple sub-assemblies that are mated together, such as for large conveyor sizes.

DETAILED DESCRIPTION

Figure 1:
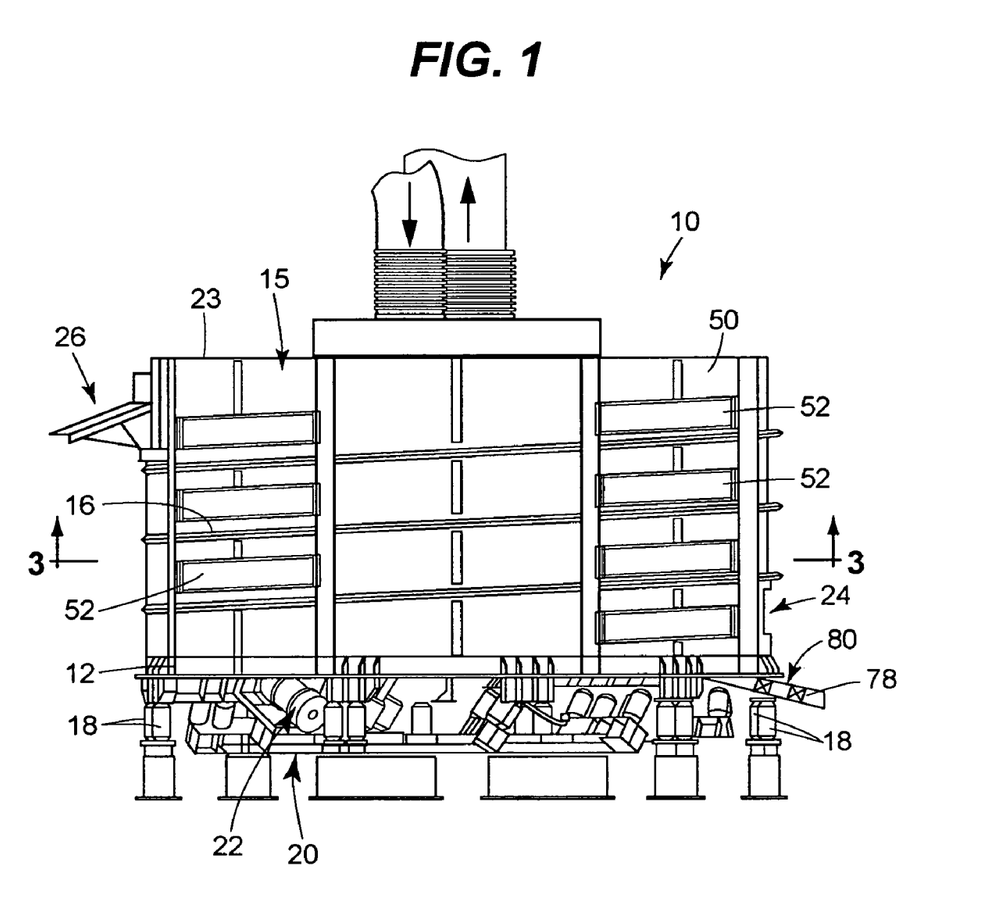
FIG. 1 is a side elevation view of a vibratory spiral conveyor.
Figure 2:
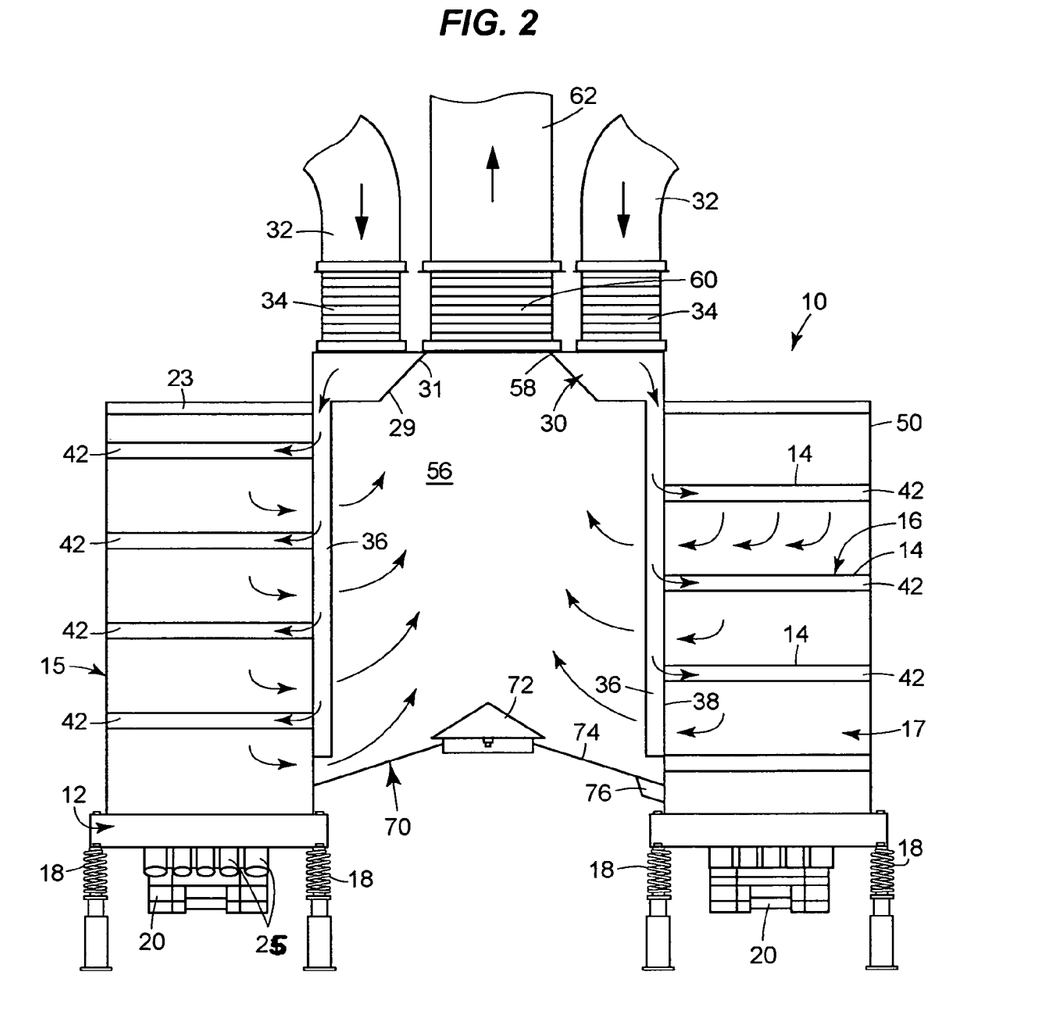
FIG. 2 is an enlarged sectional side view of the conveyor of FIG. 1.

Referring to FIGS. 1 and 2, a spiral conveyor 10 is shown having a frame 12 supporting a spiral deck 16. As used herein, the word spiral includes helix and helicoid shapes. The frame 12 is resiliently supported above the ground or mounting surface by isolation means, such as springs 18. An exciter mass 20 and vibration generators 22 are resiliently coupled to the trough frame 12, such as by springs 25 (FIG. 2). Any generally known vibration generators may be used, such as motors having rotating shafts carrying eccentric weights.

A housing 15 is provided for enclosing the spiral deck 16 and defining a conveyor chamber 17. As best shown with reference to FIG. 3, the spiral deck includes an inner edge 19 and an outer edge 21. The housing 15 has a cylindrical inner wall 38 coupled to the spiral deck inner edge 19 and a cylindrical outer wall 50 coupled to the spiral deck outer edge 21. The housing 15 may also include a top wall 23 (FIG. 2), so that the housing 15 completely encloses the spiral deck 16 but for a housing inlet 24 and outlet 26. Accordingly, the housing 15 and spiral deck 16 define the conveyor chamber 17, which has a spiral configuration in the illustrated embodiment. A plurality of access doors 52 (FIG. 1) may be formed in the housing outer wall 50 for accessing the conveyor chamber 17 and deck 16.

In the illustrated embodiment, the spiral deck 16 is oriented to vertically elevate work pieces, such as hot castings, from the inlet 24 to the outlet 26. The work pieces may be transferred from an origination point, such as a molding line, to the inlet 24 by any conveying means, such as by a linear vibratory or other type of conveyor (not shown). The spiral deck 16 is formed in a helical pattern so that, as the work pieces move circumferentially around the deck, they are also elevated in the vertical direction. At the outlet 26, the work piece may be deposited onto an outlet transport (not shown), which may also be a conveyor. While the conveyor 10 is described herein as conveying the work pieces vertically upward, the inlet and outlet may be reversed so that the work pieces are conveyed vertically downward along the spiral deck 16.

When viewed in elevational cross-section, as shown in FIG. 2, the spiral deck 16 defines a plurality of stacked tier segments 14. The tier segments 14 are vertically aligned so that adjacent tier segments 14 define upper and lower boundaries of a cross-sectional area of the conveyor chamber 17.

The vibration generators 22 may be controlled in any known fashion to produce the desired vibrational motion of the trough frame 12 and coupled spiral deck 16 to advance the work pieces along the deck 16. For example, the motors may be rotated in opposite directions (i.e., counter-rotated) and controlled to maintain a desired phase angle between the eccentric weights. While the illustrated embodiment is a two mass system, it will be appreciated that the conveyor 10 may be provided as a single mass or brute force system.

Figure 3:
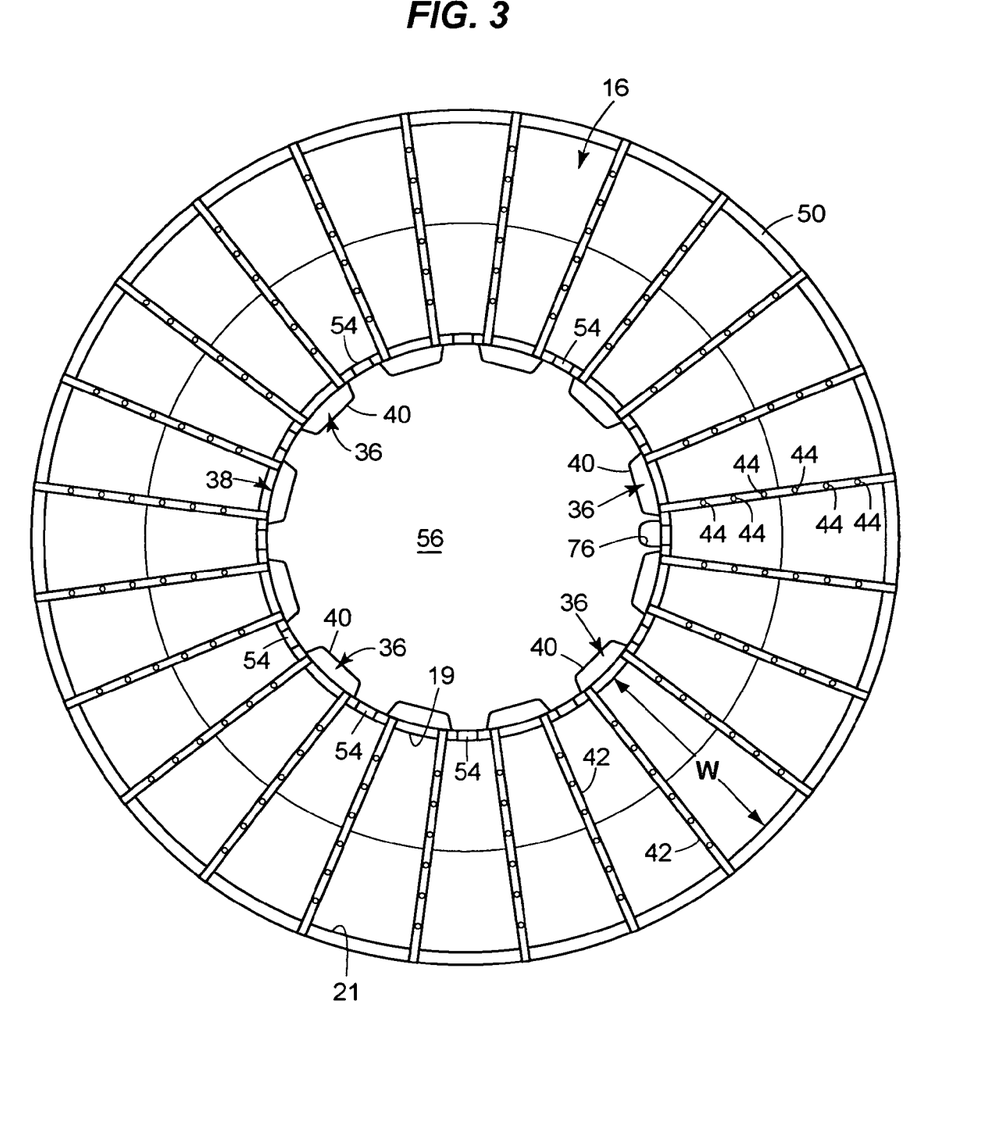
FIG. 3 is an enlarged cross-sectional view taken along line 3—3 of FIG. 1.

An air distribution system is provided for directing air over the work pieces as they travel along the spiral deck 16. As best shown in FIG. 2, a plenum housing 29 defines an inlet air plenum 30 formed near a top of the spiral deck 16 and within a central chamber 56 defined by the housing inner wall 38. A pair of air inlet ducts 32 is connected to the plenum housing 29 by flexible joints 34. Alternatively, a single inlet duct 32 or more than two inlet ducts 32 may communicate with the inlet air plenum 30. Extending downwardly from the inlet air plenum 30 is a plurality of vertical air conduits 36. As best shown in FIG. 3, the housing inner wall 38 forms outer portions of each conduit 36, while concave chamber walls 40 form a remainder of each conduit 36. Air flow may be generated by a positive air pressure source in fluid communication with the inlet air plenum 30 or a negative air pressure source in fluid communication with the central chamber 56.

A plurality of air distribution chambers 42 is attached to a bottom side of the spiral deck 16 and communicates with each vertical air conduit 36. The air distribution chambers may be oriented to extend generally horizontally and, as best shown in FIG. 3, may be aligned generally radially between the housing inner wall 38 and housing outer wall 50. In the illustrated embodiment, a pair of air distribution chambers 42 on each spiral deck tier portion 14 fluidly communicates with a respective vertical air conduit 36. Alternatively, each air conduit 36 may fluidly communicate with a single air distribution chamber 42 or more than two air distribution chambers 42 on each spiral deck tier portion 14. While FIG. 3 illustrates a single tier portion 14 of the spiral deck 16, it will be appreciated that similar sets of air distribution chambers 42 may be constructed on each of the spiral deck tier segments 14, so that each conduit 36 may communicate with multiple vertical levels of air distribution chambers 42.

Each air distribution chamber 42 includes a plurality of spaced nozzles 44 oriented to direct air flow downwardly toward the next lower tier. The nozzles 44 may be apertures formed in a bottom of the air distribution chambers 42. The apertures are arranged across at least a portion of a lateral width "W" of the spiral deck 16 to form an air distribution pattern. In the illustrated embodiment, the apertures are generally equally spaced across the entire lateral width "W" of the spiral deck 16.

The vertical air conduits 36 and horizontal air chambers 42 may be formed of structural steel members, such as channels and angles, to provide structural support to the spiral conveyor 10. In this case, the conduits 36 and chambers 42 provide the dual functions of air distribution and structural support.

The vibratory conveyor 10 further provides for exhaust of air out of the conveyor chamber. As best shown in FIG. 3, a plurality of outlet openings 54 are formed in the housing inner wall 38, each opening 54 being positioned between adjacent vertical air conduits 36. The outlet openings 54 fluidly communicate with the central chamber 56 defined by the housing inner wall. An air exhaust outlet 58 fluidly communicates with the central chamber 56 and is coupled, such as by flexible joint 60, to exhaust duct 62. The exhaust duct 62 may communicate with an air vacuum source 63 (schematically illustrated in FIG. 2), such as an exhaust fan, to create air flow through the air distribution system. In the illustrated embodiment, the plenum housing 29 has a generally annular shape, so that an inner edge 31 of the plenum housing 29 defines the exhaust outlet 58.

In operation, the air vacuum source pulls air through the inlet ducts 32 to the inlet air plenum 30. The air stream flows from the plenum through the air conduits 36 and air distribution chambers 42 for discharge through the nozzles 44, which evenly distribute air across the entire lateral width "W" of the spiral deck 16. The air vacuum source is preferably sized so that the air stream discharged from each nozzle 44 has a velocity sufficiently high to create non-laminar flow around the work pieces. By creating a non-laminar air flow, the heat transfer coefficient for the system is increased, thereby increasing heat transfer, which is beneficial for both heating and cooling applications. The air exits the conveyor chamber 17 through the outlet openings 54 and into the central chamber 56, where it is discharged through the exhaust outlet 58.

The conveyor 10 may include a fines collection system for collecting any fines entrained in the air stream passing through the conveyor chamber 17. The objects or work pieces loaded into the conveyor 10 may include unwanted debris, such as sand, sprue, or other fines material. To remove this debris from the air stream, the fines collection system may include a catch floor 70 extending across a bottom of the central chamber 56 and coupled to the housing 15 below the lowest outlet opening 54. In the illustrated embodiment, the catch floor includes a conical center portion 72 attached to a frusto-conical outer portion 74. A fines discharge opening 76 is formed at an outer periphery of the outer portion 74 and communicates with a fines discharge chute 78 (FIG. 1). The discharge opening communicates with atmosphere via the chute 78, and therefore the negative pressure in the central chamber 56 creates a pressure differential that tends to hold the fines within the chamber 56. As schematically illustrated in FIG. 1, an air lock 80 may be provided in the chute 78 to allow and control discharge of fines through the chute.

In operation, air is discharged from the nozzles 44 at a relatively high velocity, so that fines may become dislodged from the work pieces and entrained in the air stream. The air stream then passes through the outlet openings 54, which causes a pressure drop and associated reduction in velocity of the air stream as it enters the central chamber 56. The reduced velocity causes the fines entrained in the air stream to drop to the catch floor 70. The vibratory motion of the spiral deck 16 and attached catch floor 70 moves the particles toward an outer periphery of the catch floor outer portion 74. The circular component of the vibratory motion conveys the particles circumferentially about the floor periphery until the particles reach the discharge opening 76, at which point they travel down the discharge chute 78 and into the air lock 80. The air lock 80 may be operated to periodically interrupt fluid communication between the chute 78 and the central chamber 56, thereby to allow a batch of fines to be discharged from the chute 78 for collection.

The fines collection system utilizes the existing internal structure of the spiral conveyor to collect and discharge particles entrained in the air stream. As a result, separate filter houses are not required and the space required for spiral conveyor apparatus is reduced.

FIGS. 4–9 illustrate an alternative embodiment of a conveyor deck having a conveying surface and a back surface. A rib is attached to the back surface and a "force assembly" is coupled to the rib. By applying a force to the rib with the force assembly, the deck may be bowed either concavely or convexly. If formed with a concave bend, the conveying surface of the deck, when viewed in cross-section, will have a localized low point adjacent the rib that defines a deck along-which objects are conveyed. The concave shape also tends to orient cylindrical objects longitudinally on the deck, defined herein as parallel to the direction of travel. Additionally, when used in a spiral conveyor, the bowed cross-sectional shape allows the deck to be formed more nearly to a pure helicoid, where the pitch of the deck is consistent along the entire conveyor path and each radial cross section of the deck will have linear opposing deck edges, regardless of whether the deck is curved concavely or convexly. While the disclosed embodiment is a spiral conveyor, it will be appreciated that the bowed deck shape provides advantages for other conveyor path configurations, including linear, curved, and inclined paths.

Figure 4:
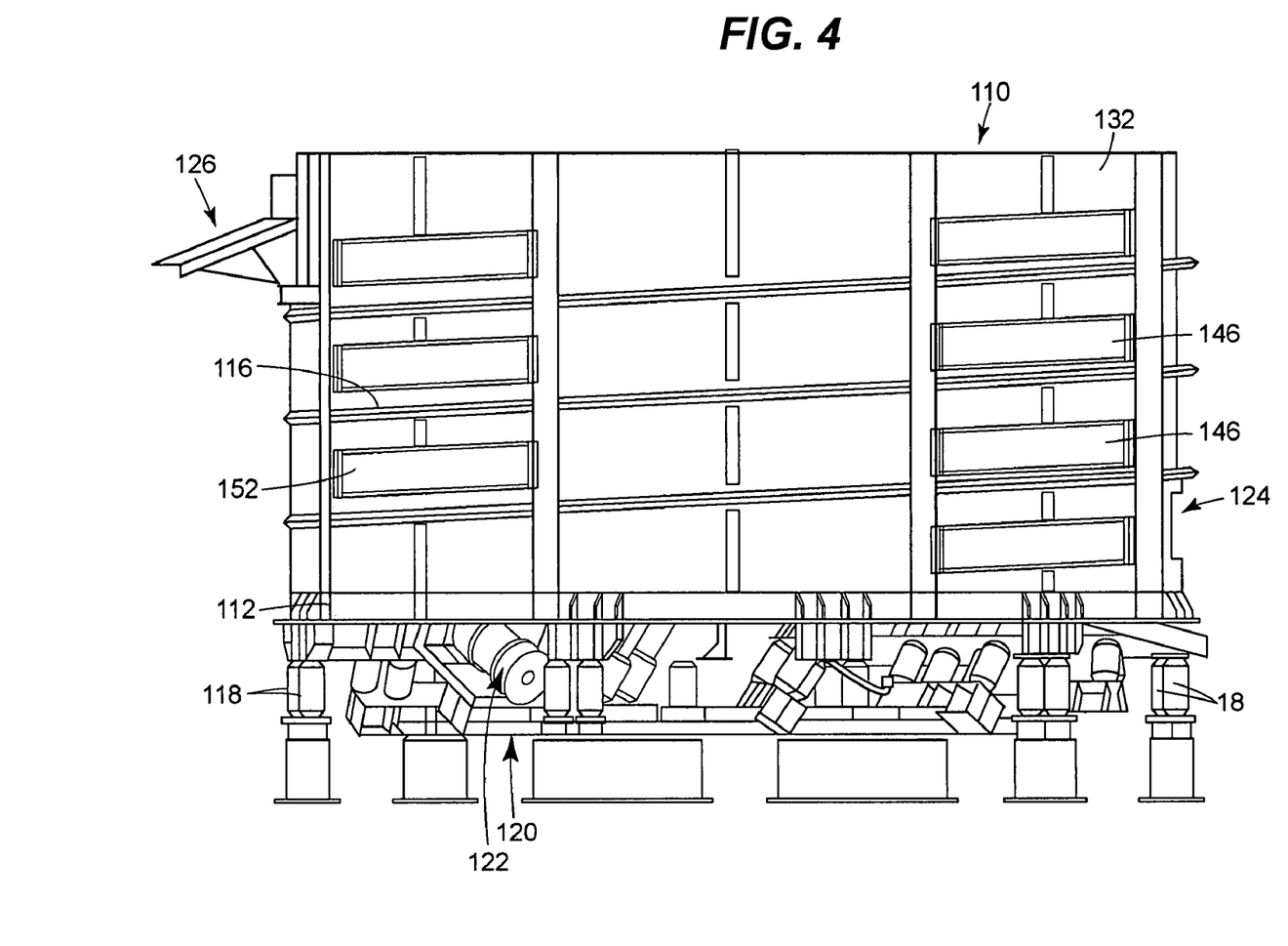
FIG. 4 is a side elevation view of a vibratory spiral conveyor.
Figure 5:
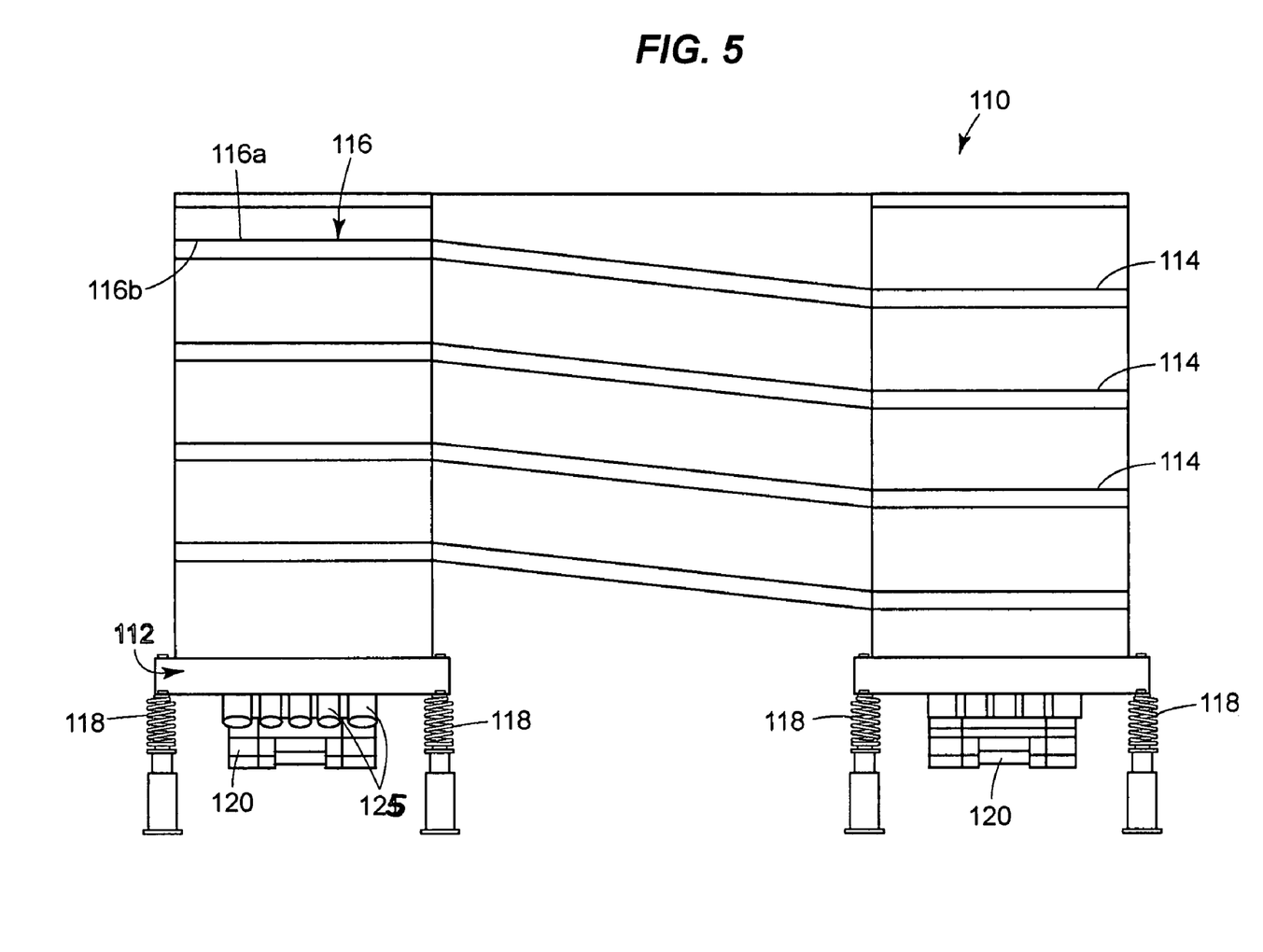
FIG. 5 is an enlarged, partially schematic, sectional side view of the conveyor of FIG. 4.
Figure 6:
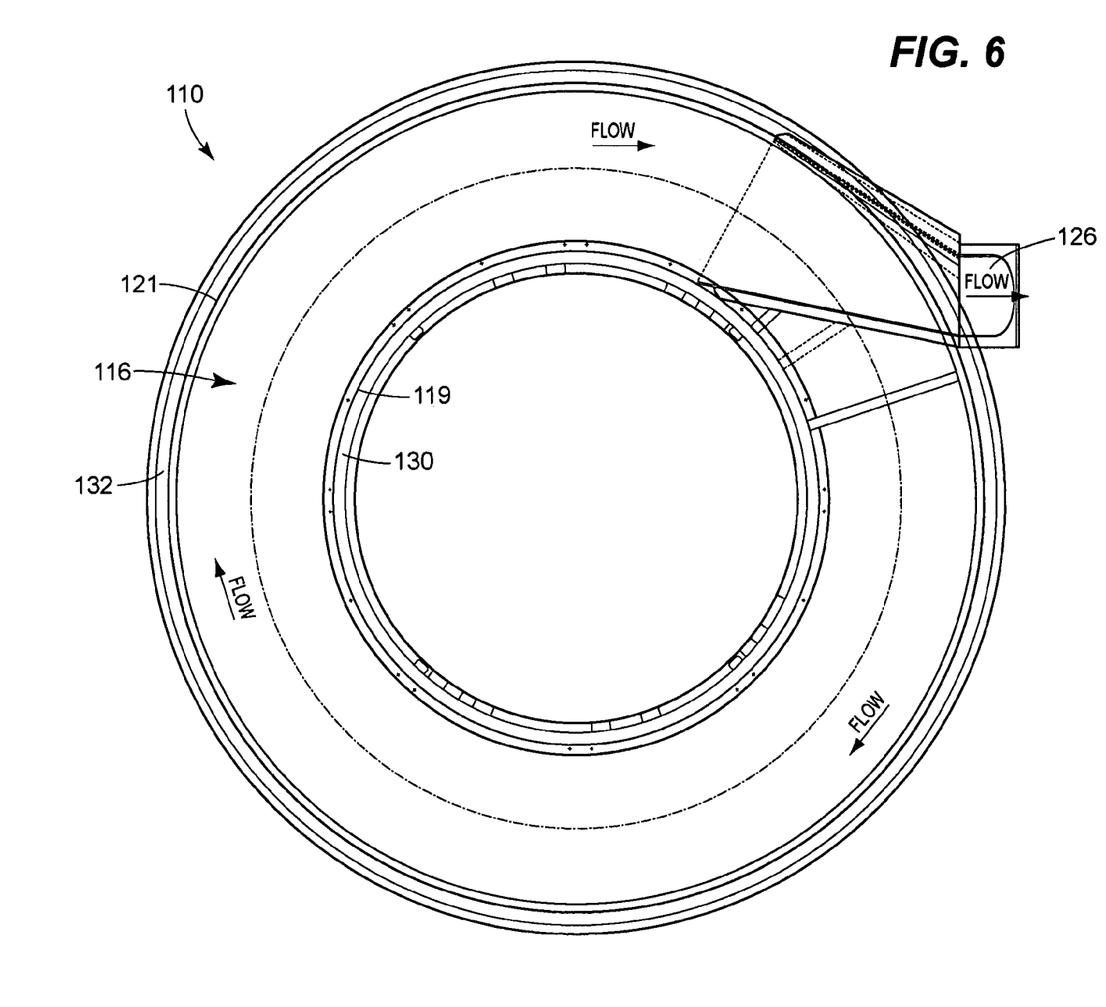
FIG. 6 is a plan view of the conveyor of FIG. 4.

Referring to FIGS. 4 and 5, a spiral conveyor 110 is shown having a frame 112 supporting a spiral deck 116. The frame 112 is resiliently supported above the ground or mounting surface by isolation means, such as springs 118. An exciter mass 120 and vibration generators 122 are resiliently coupled to the frame 112, such as by springs 125 (FIG. 5). Any generally known vibration generators may be used, such as motors having rotating shafts carrying eccentric weights.

Figure 7:
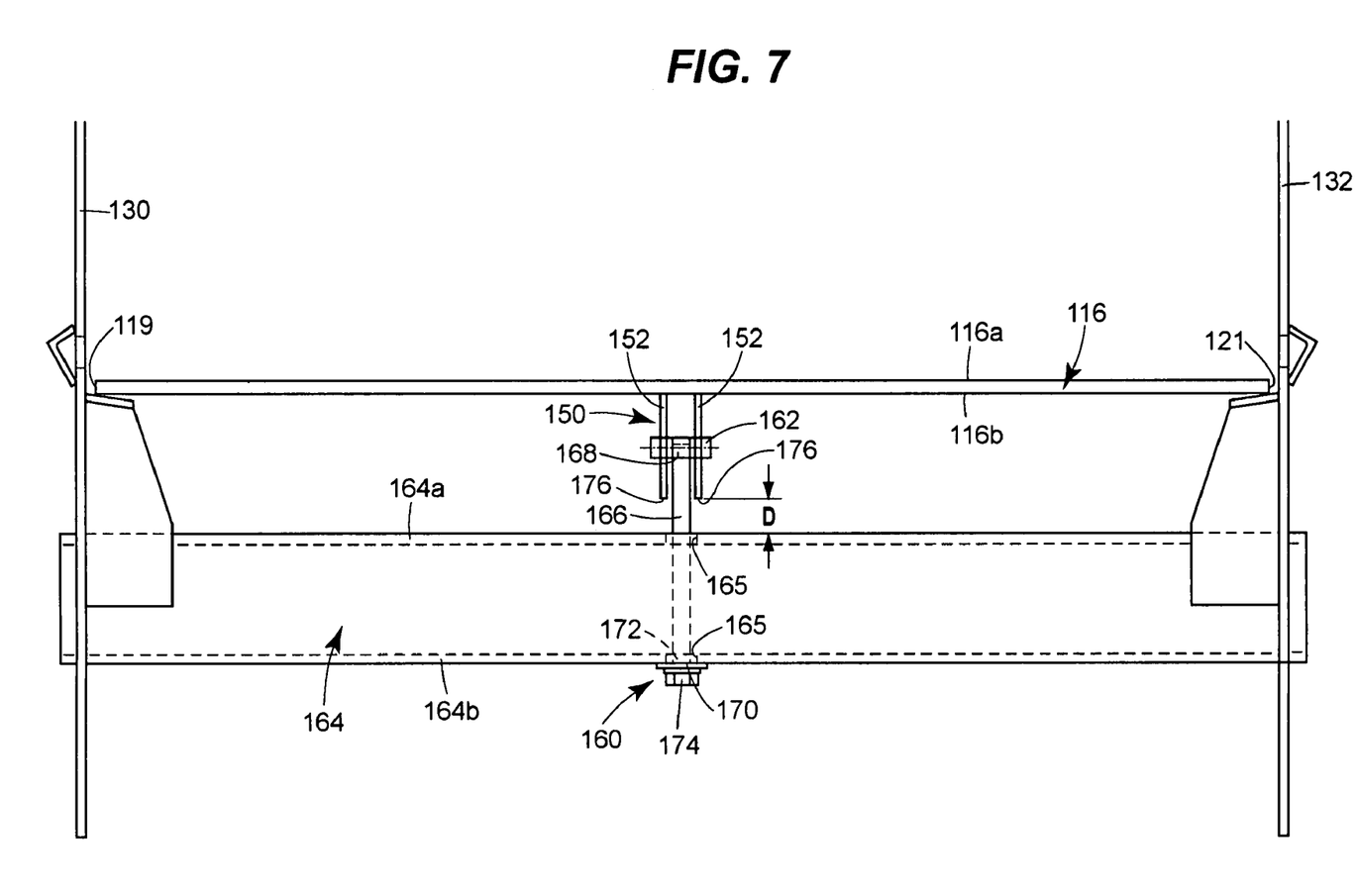
FIG. 7 is an enlarged sectional side view of a portion of the conveyor deck before the bending force is applied to the deck.
Figure 8:
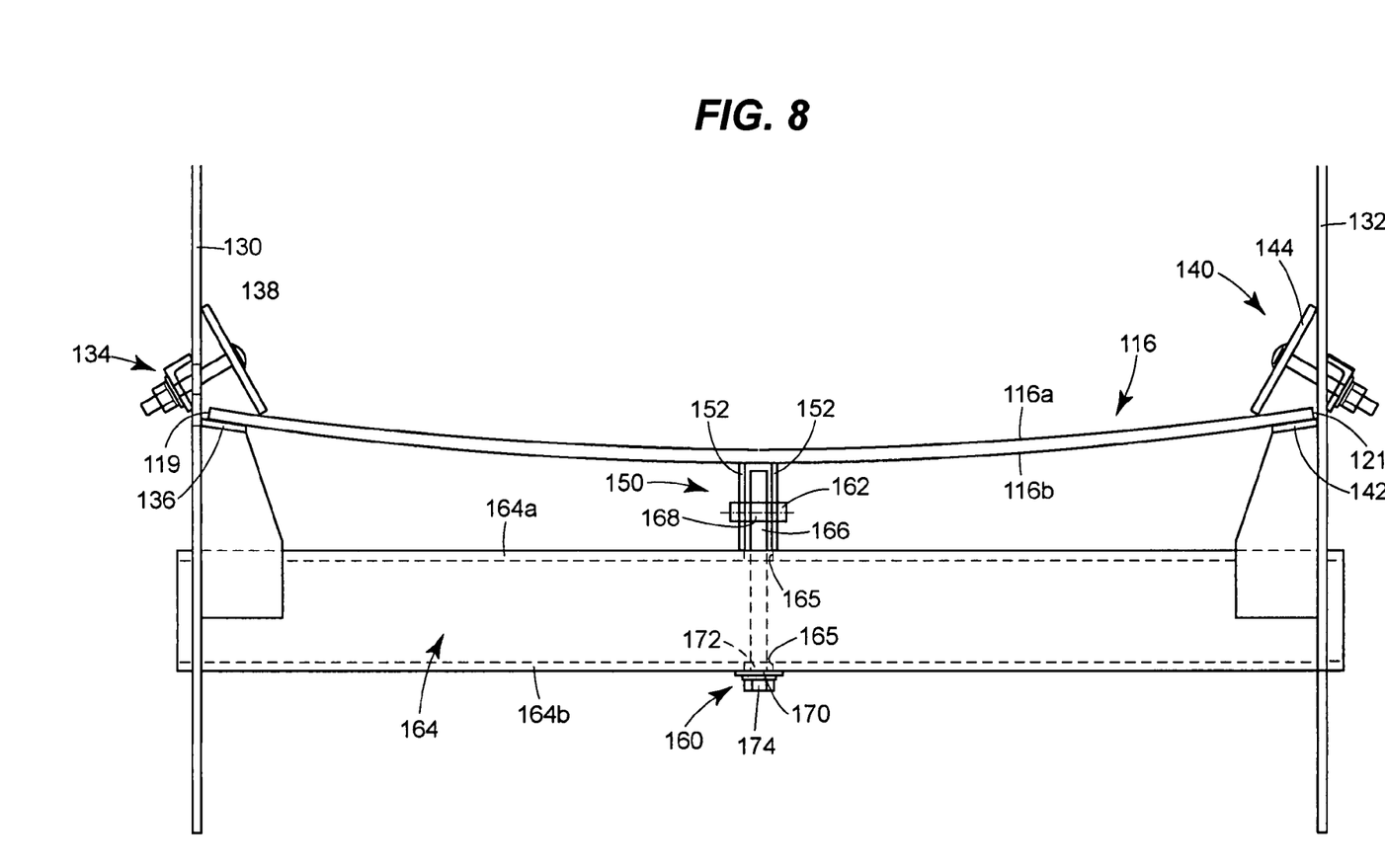
FIG. 8 is an enlarged sectional side view of a portion of the conveyor deck with a bending force applied to the deck.

The spiral deck 116 is oriented to vertically elevate work pieces, such as hot castings, from an inlet 124 to an outlet 126. The deck 116 defines a conveying surface 116a for receiving the work pieces and a back surface 116b (FIGS. 7 & 8). The work pieces may be transferred from an origination point, such as a molding line, to the inlet 124 by any conveying means, such as by a linear vibratory or other type of conveyor (not shown). The spiral deck 116 is formed in a helical pattern so that, as the work pieces move circumferentially around the deck, they are also elevated in the vertical direction. When the conveyor 110 is viewed in elevational cross-section, as schematically shown in FIG. 5, the spiral deck 116 defines a plurality of stacked tier segments 114. At the outlet 126, the work piece may be deposited onto an outlet transport (not shown), which may also be a conveyor. While the conveyor 110 is described herein as conveying the work pieces vertically upward, the inlet and outlet may be reversed so that the work pieces are conveyed vertically downward along the spiral deck 116.

The vibration generators 122 may be controlled in any known fashion to produce the desired vibrational motion of the frame 112 and coupled spiral deck 116, thereby to advance the work pieces along the deck 116. For example, the motors may be rotated in opposite directions (i.e., counter-rotated) and controlled to maintain a desired phase angle between the eccentric weights. While the illustrated embodiment is a two mass system, it will be appreciated that the conveyor 110 may be provided as a single mass or brute force system.

Figure 9:
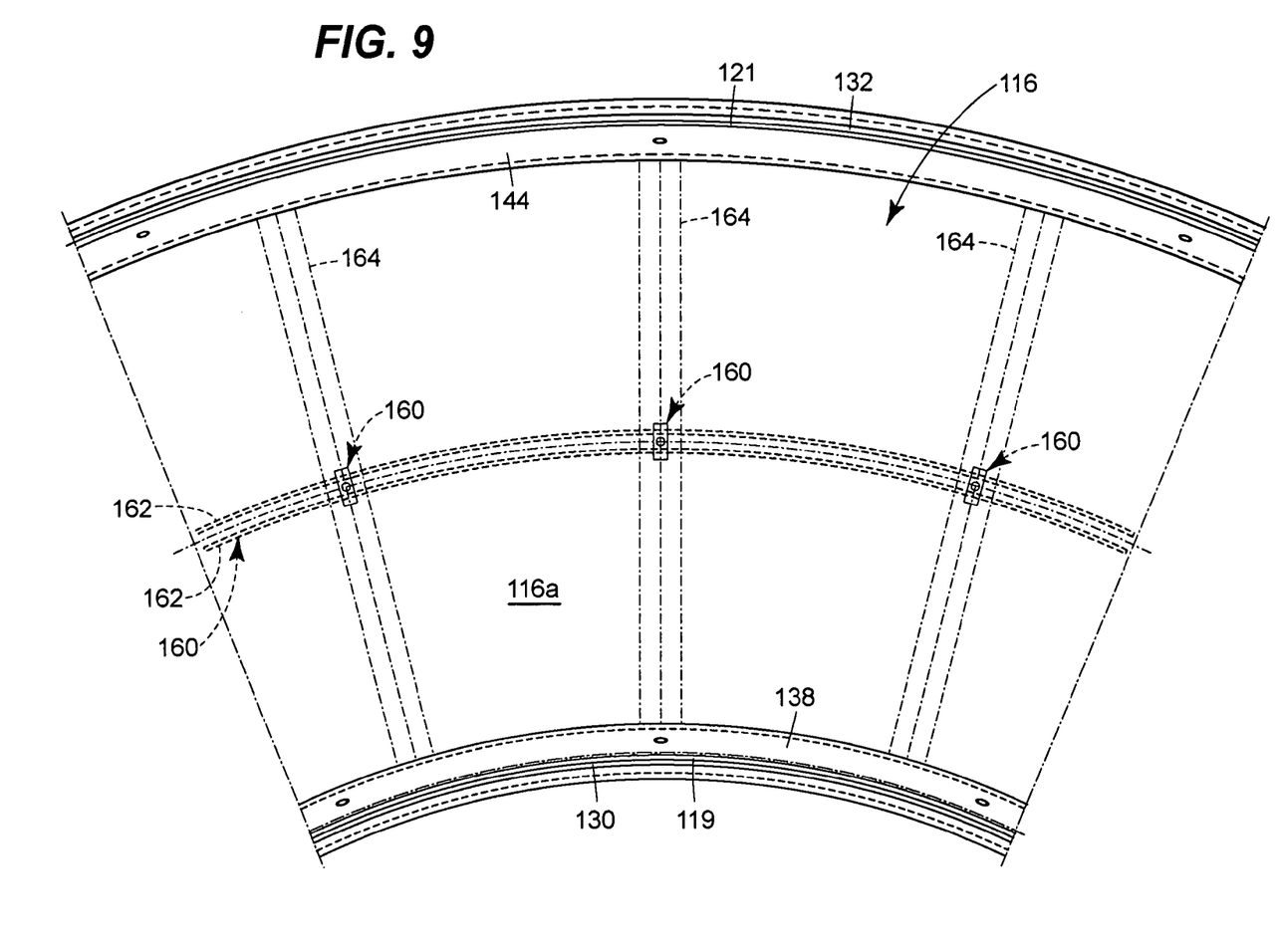
FIG. 9 is a plan view of a section of the deck.

As best shown with reference to FIGS. 7–9, the spiral deck 116 includes an inner edge 119 and an outer edge 121. An inner housing wall 130 is coupled to the spiral deck inner edge 119 and an outer housing wall 132 is coupled to the spiral deck outer edge 121. More specifically, the deck inner edge 119 is secured to the inner housing wall 130 by a first or inner wall support assembly 134, which may clamp the deck inner edge 119 between a bottom flange 136 and a top retainer 138 (FIG. 8). Similarly, the deck outer edge 121 may be secured to the outer housing wall 132 by a second or outer wall support assembly 140, which may clamp the deck outer edge 121 between a bottom flange 142 and a top retainer 144. A plurality of access doors 146 (FIG. 4) may be formed in the housing outer wall 132 for accessing the different tier portions 114 of the deck 116, should the outer housing wall 132 completely enclose the deck 116.

A rib assembly 150 is attached to the deck back surface 116b between the inner and outer deck edges 119, 121 (FIGS. 7–9). The rib assembly may 150 may extend continuously along the deck 116 in the longitudinal direction, so that, in the illustrated embodiment, the rib assembly has a spiral shape. The rib assembly 150 may include a pair of ribs 152 having aligned transverse apertures.

A force assembly 160 coupled to the rib assembly 150 to create a force that bends the deck 116 into an arcuate shape when viewed in cross-section. The exemplary force assembly 160 includes a pin 162 mechanically coupled to the rib assembly 150, such as by insertion through the transverse apertures formed in the ribs 152. A cross support 164 is spaced from the deck 116 and supported by the inner and outer housing walls 130, 132. As shown, the cross support 64 is provided as a tubular steel member, and has apertures 65 formed in the upper and lower support surfaces 164a, 164b. A link 166 is inserted through the apertures in the cross support 164 and defines a first end 168 coupled to the pin 162 and a second end 170. The link 166 also includes a threaded portion 172 for receiving a nut 174.

The nut 174 may be adjusted on the link threaded portion 172 to generate a force in the link 166 that is transferred by the rib assembly 150 to the deck 116, thereby to bend the deck 116 in an arcuate shape. As shown in FIGS. 7 & 8, the nut 174 may be located below the cross support 164. In FIG. 7, the deck 116 is shown in a relaxed state, where the force assembly 160 applies no force to the deck 116. The nut 174 may be adjusted upwardly along the threaded portion 172 so that the nut engages the lower surface of the cross support 164, thereby to create tension in the link 166. The tension in the link 166 is transferred by the pin 162 as a downwardly directed force acting against the rib assembly 150 and attached deck 116. The nut 174 may be adjusted along the threaded portion 172 to create a tension force in the link 166 sufficient to bend the deck 116 into an arcuate shape, as shown in FIG. 8.

In an alternative embodiment, the pin 162 may be provided as a bar coupled to the ribs 152 and formed with a threaded aperture. The link 166 may be a bolt or threaded rod with the first end 168 threadably engaging the bar threaded aperture. The second end 170 of the bolt is a bolt head, which takes the place of the nut 174. Accordingly, bolt may be threaded into the bar threaded aperture to create the tension force.

The ribs 152 may project sufficiently past the pin 162 to define stop ends 176 that are engageable with the top surface 164a of the cross support, thereby to limit the amount of deflection of the deck 116. As shown in FIG. 7, when the deck 116 is in the relaxed state, the rib stop ends 176 are spaced from the top surface of the cross support by a known distance "D". As the nut 174 is tightened to deflect the deck 116, the stop ends 176 are drawn toward and eventually engage the cross support top surface 164a, thereby limiting the amount of deflection of the deck 116.

While the illustrated embodiment shows the deck conveying surface 116a bent into a concave arcuate shape, the conveying surface may also be formed with a convex arcuate shape. To do so, the force assembly 160 may be modified so that the link threaded portion 172 is adjacent an upper surface of the cross support 164, and the nut 174 may be adjusted downwardly along the threaded portion to engage the upper surface 164a of the cross support. Consequently, a compression force is generated in the link 166 that is transferred by the pin 162 as an upwardly directed force against the rib assembly 160 and attached deck 116.

To create the compression force in the alternative embodiment described above, a nut may simply be provided on the bolt above the cross support upper surface 164a, and the nut may be adjusted downwardly along the bolt to engage the upper surface 164a.

While only a single force assembly 160 is shown coupled to the rib assembly 160 in FIGS. 7 & 8, it will be appreciated that a plurality of force assemblies may be coupled to the rib assembly 160 at points spaced along the longitudinal length of the rib assembly 150. In the segment of the deck 116 shown in FIG. 9, a total of three force assemblies 160 are shown coupled to the rib assembly 150. FIG. 9 also illustrates the ribs 162 extending along the longitudinal length of the deck 116. Furthermore, while a single deck segment is shown in FIG. 9, it will be appreciated that multiple deck segments may be fabricated independently and assembled to create the complete conveyor deck. The improved fit of the arcuate shaped deck allows the ends of the deck segments to be more reliably located, thereby facilitating assembly of mating deck segments.

While a spiral conveyor path has been described and illustrated, the present disclosure is applicable to other conveyor path configurations requiring different deck shapes, such as linear, inclined, or curved decks, while still providing some or all of the benefits described herein. Still further, multiple concentric (in the case of curved or spiral path configurations) or parallel (in the case of linear path configurations) rib assemblies may be attached to the deck 116 or adjacent sub-decks, each of which having force assemblies coupled thereto, so that the deck is bent with multiple arcs defining multiple lanes for transporting a column of objects.

Figure 10:
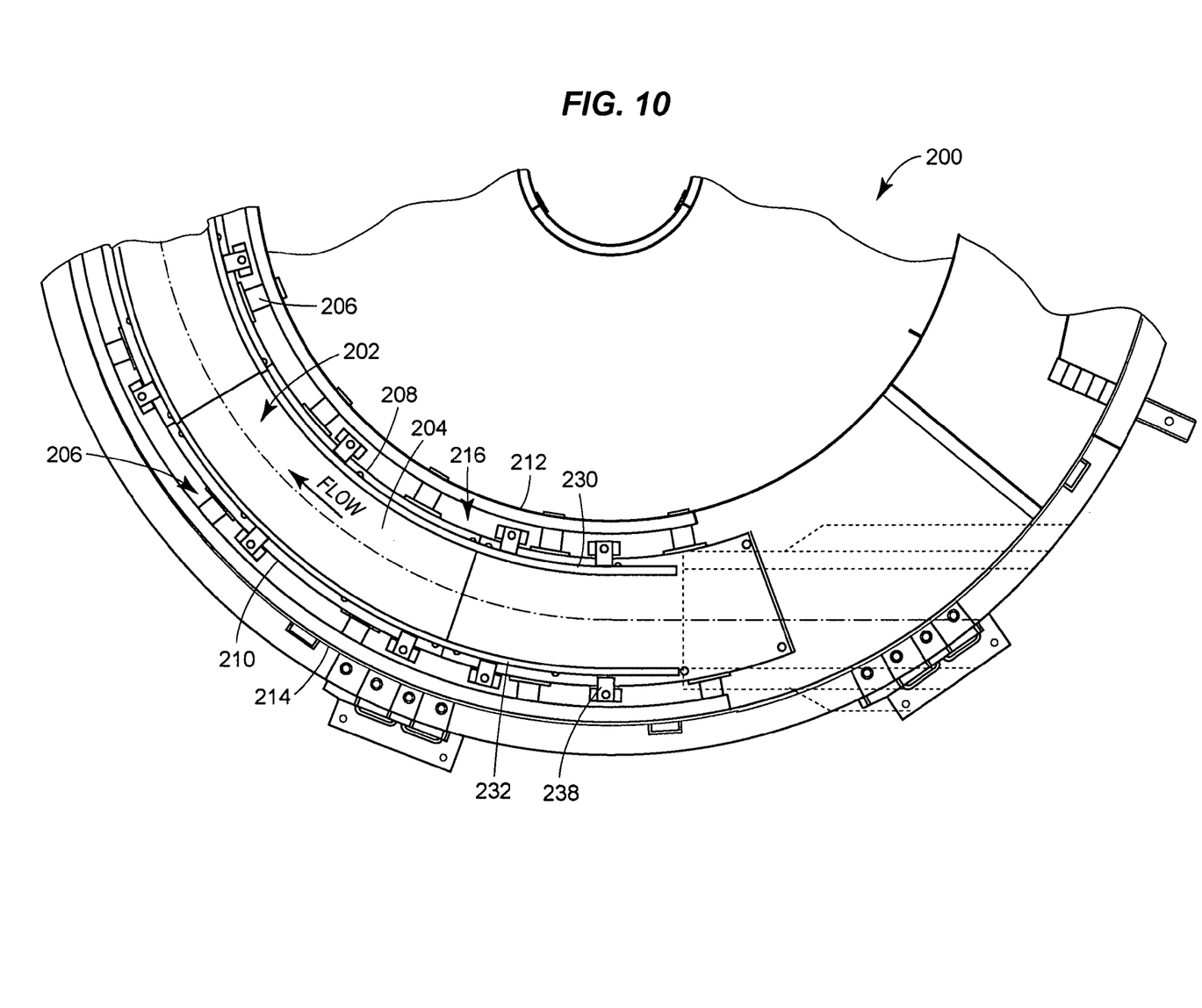
FIG. 10 is a plan view of a section of a spiral conveyor having air flow passages around the deck.
Figure 11:
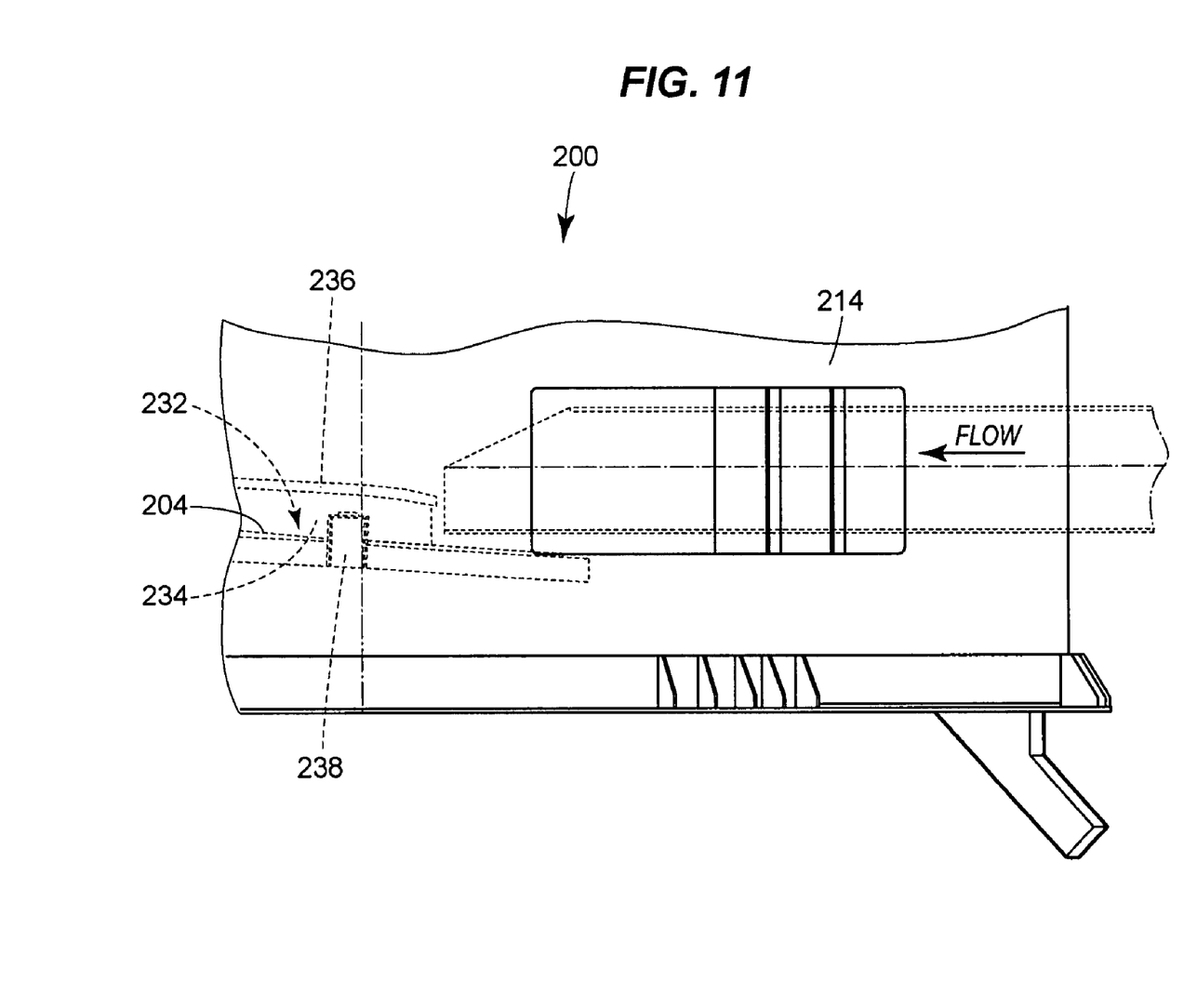
FIG. 11 is a side elevational view of the spiral conveyor portion illustrated in FIG. 10.

Another alternative spiral conveyor 200 is illustrated in FIGS. 10 & 11 having a deck assembly 202 that allows air to flow around the deck, thereby to increase the dwell time of the air within the conveyor 200. The deck 202 is coupled to a vibration generator, such as motors having rotating shafts carrying eccentric weights as disclosed above, which creates a vibratory force for advancing objects in the desired direction along the deck assembly 202.

The deck assembly 202 includes a deck 204 supported by cross supports 206. The illustrated deck 204 has a helical shape defining a plurality of vertically stacked tier segments 205. The deck 204 includes inner and outer edges 208, 210 that are spaced from an inner housing 212 and an outer housing 214, respectively, to define inner and outer gaps 216, 218 therebetween. The inner and outer housings 212, 214 enclose the deck 204 to define a conveyor chamber.

As with previous embodiments, the cross supports 206 may include apertures (not shown) for distributing air over objects conveyed along the deck. In this embodiment, the inner housing 212 may be imperforate, so that air from the apertures that is directed toward the deck 204 passes through the inner and outer gaps 216, 218 to an adjacent tier of the deck. A single outlet may be located at the bottom tier to direct exhaust air toward atmosphere. Accordingly, the average dwell time of the air provided to the conveyor 200 is increased, and construction of the conveyor is simplified by requiring only a single exhaust outlet.

The deck assembly 202 may further include inner and outer guide rails 230, 232. The guide rails may be used to at least partially support the objects transported by the conveyor 200, and/or to prevent objects and debris from falling through the inner and outer gaps 216, 218. Each of the inner and outer guide rails 230, 232 may include a vertical support 234, which, for example, may be formed of bar stock, and contact surface 236, which, for example, may be formed of tube stock. As best illustrated in FIG. 10, the inner and outer rails 230, 232 are secured to the deck 204 with guide rail supports 238.

Figure 12:
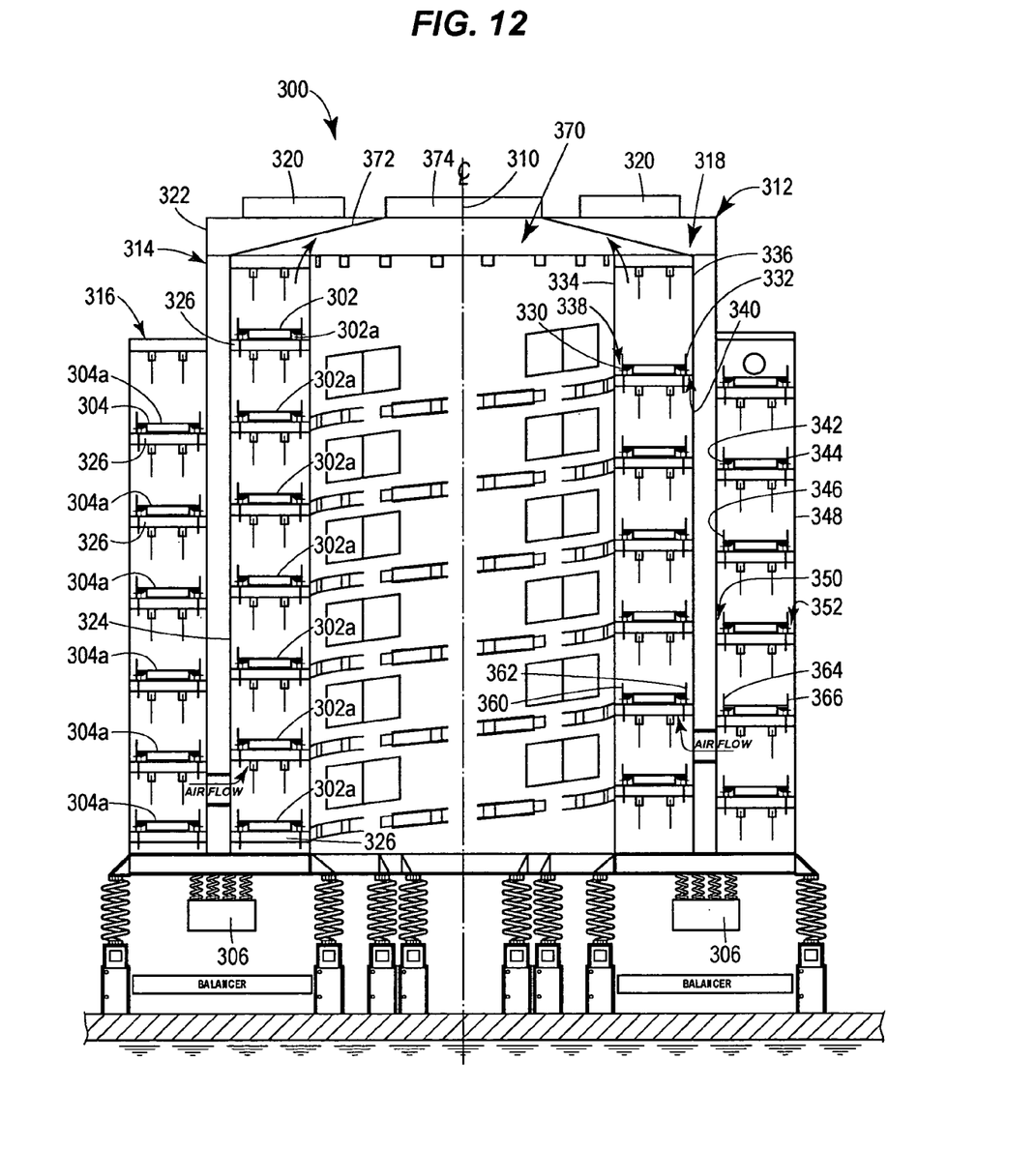
FIG. 12 is side elevational view, in cross-section, of a spiral conveyor having two spiral decks.
Figure 13:
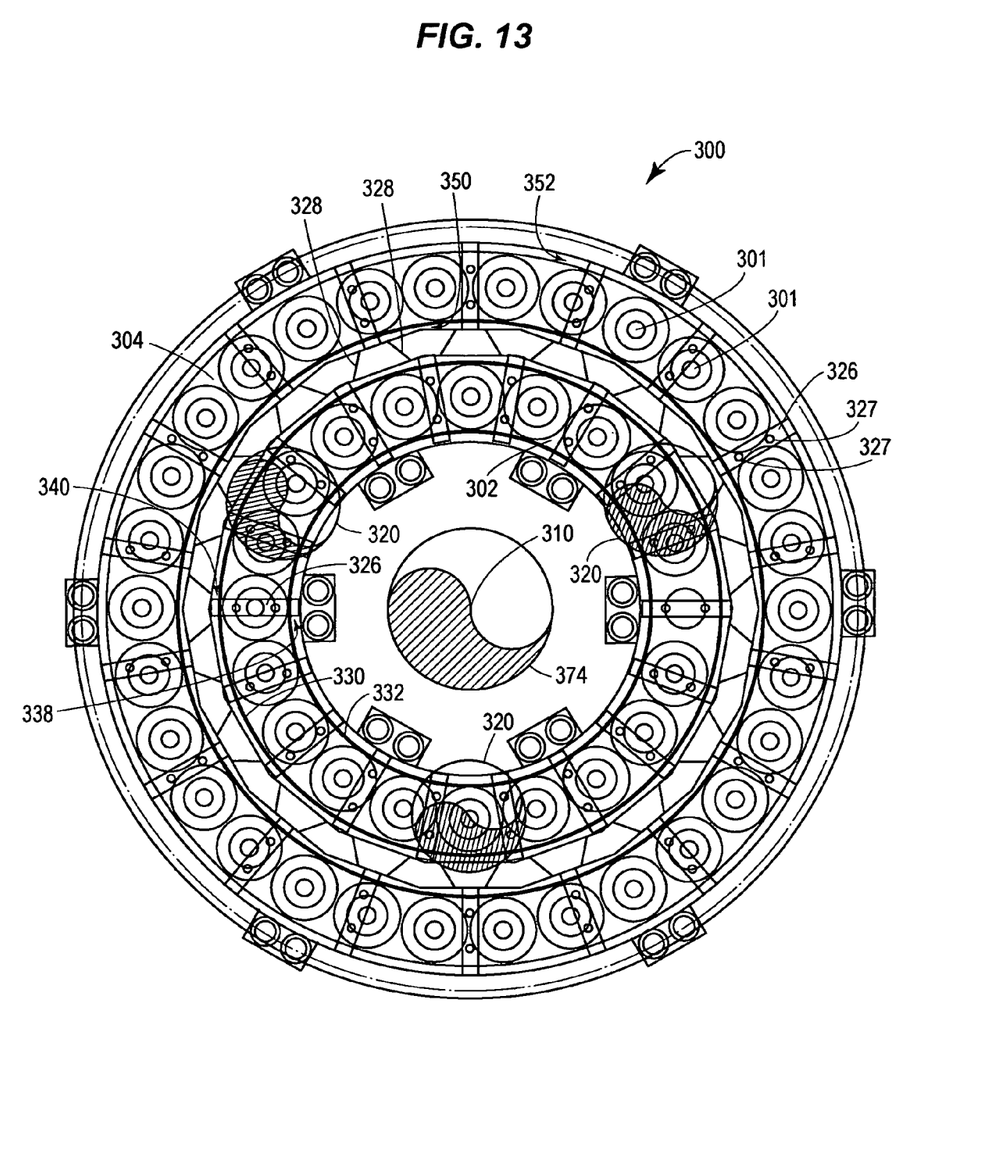
FIG. 13 is a plan view of the spiral conveyor of FIG. 12.

FIGS. 12 and 13 illustrate yet another embodiment of a spiral conveyor 300 having inner and outer spiral decks connected in series to increase the dwell time of objects transported through the conveyor 300 while minimizing additional space requirements. The objects may be castings 301, such as drums or rotors that require cooling. The spiral conveyor 300 includes a first spiral deck 302 defining a conveying surface, and includes a plurality of tier segments 302a. A second spiral deck 304 is operatively coupled to the first spiral deck 302 and defines a conveying surface, the second spiral deck 304 also having a plurality of tier segments 304a. Adjacent ends of the first and second spiral decks 302, 304 may simply be connected together to form a single, continuous conveying path that traverses both decks.

An exciter mass assembly 306 is coupled to the first and second decks 302, 304, and includes a vibration generator adapted to generate a vibratory force. The vibratory force advances objects, such as castings 301, along the first and second spiral decks 302, 304 simultaneously in different vertical directions. For example, objects may be transported vertically downward along the first spiral deck 302 and vertically upward along the second spiral deck 304. Accordingly, the first and second spiral decks 302, 304 may be arranged to emulate a "double helix" pattern.

As best shown with reference to FIG. 13, the first and second spiral decks 302, 304 are substantially concentric about a common axis 310. Accordingly, the first spiral deck is disposed substantially at a first radius while the second spiral deck is disposed at a second radius greater than the first radius, so that the first spiral deck is disposed inside or "nested" within the second spiral deck.

A housing 312 is provided for enclosing the first and second decks 302, 304 and for assisting in directing cooling air to the decks. The housing includes a first chamber 314 for enclosing the first spiral deck 302 and a second chamber 316 for enclosing the second spiral deck 304. The first and second chambers 314, 316 define a conveyor chamber extending along the conveyor path defined by the two decks 302, 304. In the illustrated embodiment, the first chamber 314 defines an inlet for receiving the objects to be conveyed and the second chamber 316 defines an outlet for discharging the conveyed objects.

An inlet air plenum 318, which may include three inlets 320, is formed by the housing and is adapted to direct cooling air, provided by an air source, into the conveyor chamber. The inlet air plenum 318 includes a roughly cylindrical inlet portion 322 and a generally annular distribution portion 324 disposed between the first and second housing chambers 314, 316.

Air distribution chambers 326 extending generally radially across the first and second housing chambers 314, 316 communicate with the inlet plenum distribution portion 324 and include apertures 327 for directing air downwardly toward the first and second spiral decks 302, 304. In the illustrated embodiment, the air distribution chambers 326 also support the first and second spiral decks 302, 304, which are connected to upper sides of the chambers 326. The distribution portion 324 may include divider walls 328 for directing air toward the distribution chambers 326. Accordingly, a single inlet air plenum 318 directs cooling air to both the first and second housing chambers 314, 316.

The conveyor 300 includes air flow passages communicating between adjacent tier segments of the first and second spiral decks 302, 304. The first spiral deck 302 has inner and outer edges 330, 332 that are spaced from inner and outer walls 334, 336 of the housing first chamber 314. The space between the inner edge 330 and inner wall 334 defines a first deck inner gap 338, while the space between the outer edge 332 and outer wall 336 defines a first deck outer gap 340. Air provided from the air distribution chambers 326 may therefore flow toward the nearest tier segment 302a and through the first deck inner and outer gaps 338, 340 to an adjacent tier segment 302a.

Similarly, the second spiral deck 304 has inner and outer edges 342, 344 that are spaced from inner and outer walls 346, 348 of the second housing chamber 316. The space between the inner edge 342 and inner wall 346 defines a second deck inner gap 350, while the space between the outer edge 344 and outer wall 348 defines a second deck outer gap 352. Air provided from the air distribution chambers 326 may therefore flow toward the nearest tier segment 304a and through the second deck inner and outer gaps 350, 352 to an adjacent tier segment 304a.

The first and second decks 302, 304 may further include guide rails for supporting objects to be conveyed, for retaining objects on the decks, or for directing debris removed from the objects to a collection area. In the illustrated embodiment, the first spiral deck 302 includes inner and outer guide rails 360, 362 and the second spiral deck 304 includes inner and outer guide rails 364, 366. The guide rails 360, 362, 364, and 366 may be located on their respective decks and constructed similar to those described above with reference to the embodiment of FIGS. 10 & 11.

The housing 312 may also include an outlet plenum 370 for receiving cooling air from the conveyor chamber and directing it to atmosphere. In the illustrated embodiment, the outlet plenum 370 includes a hood section 372 positioned directly above the top deck tier segment 302a of the first spiral deck 302 and an outlet 374 adapted for connection to ductwork or the like for discharging air to atmosphere. Thus, a single outlet point (i.e., above the first deck tier segment) is provided for discharging air from the conveyor chamber. Accordingly, air provided to other tier segments will pass through the inner and outer gaps 338, 340, 350, and 352 and ultimately to the outlet plenum 370, thereby increasing the period during which this air is resident in the conveyor chamber.

Sand or other fines capable of being carried by the air flow through the conveyor chamber may be removed at any convenient location. For example, where the first spiral deck 302 transitions to the second spiral deck 304, which is near the bottom of the housing 312, the reversal of air flow direction provides one possible location for collecting and removing fines.

Although certain apparatus constructed in accordance with the teachings of the disclosure have been described herein, the scope of coverage of this patent is not limited thereto. On the contrary, this patent covers all embodiments of the teachings of the disclosure fairly falling within the scope of the appended claims either literally or under the doctrine of equivalents.

What is claimed is:

1. A vibratory spiral conveyor for transporting an object, the conveyor comprising:
   a first spiral deck defining a conveying surface for supporting the object and including a plurality of tier segments;
   a second spiral deck operatively coupled side-by-side to the first spiral deck and defining a conveying surface for supporting the object and including a plurality of tier segments;
   an exciter mass assembly including a vibration generator coupled to the first and second spiral decks for generating a vibratory force, wherein the vibratory force advances the object along the first and second spiral decks.

2. The conveyor of claim 1, in which the first and second spiral decks are concentric, wherein the first spiral deck is disposed substantially at a first radius and the second spiral deck is disposed substantially at a second radius.

3. The conveyor of claim 2, in which the second radius is greater than the first radius so that the first spiral deck is nested within the second spiral deck.

4. The conveyor of claim 1, in which the vibratory force of the exciter mass assembly is oriented to transport the object along the first spiral deck in a vertically downward direction and to transport the object along the second spiral deck in a vertically upward direction.

5. The conveyor of claim 1, further comprising a housing adapted to enclose the first and second spiral decks to define a conveyor chamber.

6. The conveyor of claim 5, further comprising:
   an inlet air plenum in air flow communication with the conveyor chamber;
   air flow passages communicating between adjacent tier segments of the first and second spiral decks,
   the inlet air plenum in air flow communication with multiple tier segments via the air flow passages; and
   a source of air coupled to the inlet air plenum.

7. The conveyor of claim 6, in whieh the housing comprises a first chamber adapted to enclose the first spiral deck and having inner and outer walls and a second chamber adapted to enclose the second spiral deck and having inner and outer walls.

8. The conveyor of claim 7, in which the first spiral deck includes an inner edge spaced from the housing first chamber inner wall to define a first deck inner gap and an outer edge spaced from the housing first chamber outer wall to define a first deck outer gap, and in which the second spiral deck includes an inner edge spaced from the housing second chamber inner wall to define a second deck inner gap and an outer edge spaced from the housing second chamber outer wall to define a second deck outer gap, wherein the air flow passages comprise the inner and outer gaps of the first and second decks.

9. The conveyor of claim 7, in which the inlet air plenum is disposed between and at least partially defined by the first and second chambers of the housing.

10. The conveyor of claim 8, further comprising a first inner guide rail assembly coupled to the first spiral deck near the first deck inner edge, a first outer guide rail assembly coupled to the first spiral deck near the first deck outer edge, a second inner guide rail assembly coupled to the second spiral deck near the second deck inner edge, and a second outer guide rail assembly coupled to the second spiral deck near the second deck outer edge.

11. The conveyor of claim 8, further comprising air distribution chambers in air flow communication with the inlet air plenum, each air distribution chamber extending substantially radially between the inner and outer walls of the housing first and second chambers and having a plurality of apertures for directing air toward the first and second spiral decks.

12. The conveyor of claim 11, in which the first and second spiral decks are coupled to the air distribution chambers for support.

13. The conveyor of claim 1, further comprising an outlet air plenum adapted to exhaust air out of the conveyor chamber.

* * * * *